(12) United States Patent
Nakamura

(10) Patent No.: US 10,750,038 B2
(45) Date of Patent: Aug. 18, 2020

(54) INFORMATION PROCESSING APPARATUS, METHOD OF CONTROLLING THE SAME, AND NON-TRANSITORY COMPUTER-READABLE RECORDING MEDIUM THEREFOR

(71) Applicant: Brother Kogyo Kabushiki Kaisha, Nagoya-shi, Aichi-ken (JP)

(72) Inventor: Kenichi Nakamura, Anjo (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/523,190

(22) Filed: Jul. 26, 2019

(65) Prior Publication Data

US 2020/0045191 A1 Feb. 6, 2020

(30) Foreign Application Priority Data

Jul. 31, 2018 (JP) ................... 2018-143156

(51) Int. Cl.
*H04N 1/00* (2006.01)
*G06F 3/12* (2006.01)

(52) U.S. Cl.
CPC ....... *H04N 1/00482* (2013.01); *G06F 3/1205* (2013.01); *G06F 3/1254* (2013.01); *H04N 1/00334* (2013.01); *H04N 1/00363* (2013.01); *H04N 1/00411* (2013.01); *H04N 1/00708* (2013.01)

(58) Field of Classification Search
None
See application file for complete search history.

(56) References Cited

U.S. PATENT DOCUMENTS

| | | | |
|---|---|---|---|
| 2015/0049354 A1* | 2/2015 | Kawano | H04N 1/00336 358/1.13 |
| 2015/0110398 A1* | 4/2015 | Totsuka | G06T 11/001 382/167 |
| 2016/0219187 A1* | 7/2016 | Harada | H04N 1/3876 |

* cited by examiner

*Primary Examiner* — Lennin R RodriguezGonzalez
(74) *Attorney, Agent, or Firm* — Banner & Witcoff, Ltd.

(57) ABSTRACT

An information processing apparatus is configured to identify usage of an extract-printing image, and receive the image data output by an application. In case where the received image data represents an image having a first size, when the usage is a first usage, object image data representing a first object is extracted, while the usage is a second usage, object image data representing a second object is extracted. Then, the information processing apparatus generates image data such that when the object image data representing the first object is extracted, image data representing an image composed such that the first object is arranged on a sheet having a second size is generated. When the object image data representing the second object is extracted, image data representing an image composed such that the second object is arranged on the sheet having the second size is generated.

11 Claims, 10 Drawing Sheets

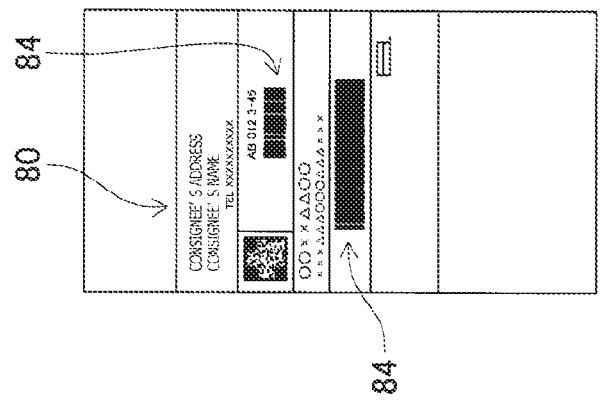
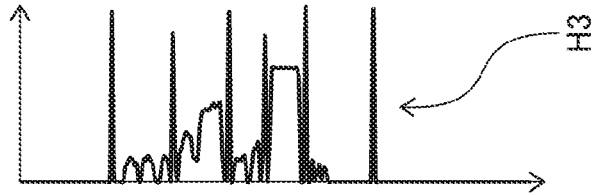
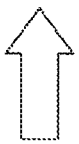
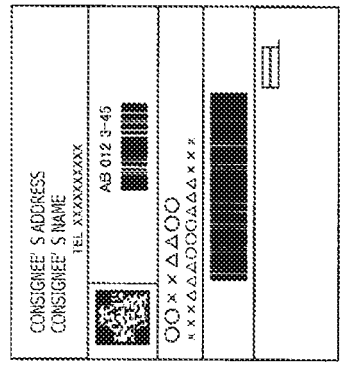
FIG. 11

INFORMATION PROCESSING APPARATUS, METHOD OF CONTROLLING THE SAME, AND NON-TRANSITORY COMPUTER-READABLE RECORDING MEDIUM THEREFOR

CROSS-REFERENCE TO RELATED APPLICATIONS

This application claims priority under 35 U.S.C. § 119 from Japanese Patent Application No. 2018-143156 filed on Jul. 31, 2018. The entire subject matter of the application is incorporated herein by reference.

BACKGROUND

Technical Field

The present disclosures relate to a non-transitory computer-readable medium storing instructions realizing a printer driver with which an object such as a barcode can be printed on a printing sheet. The present disclosures also relate to an information processing apparatus employing the printer driver.

Related Art

There has been known conventional art for printing objects such as barcodes on a label sheet on which a plurality of labels (e.g. item labels) are arranged in a matrix. An example of providing image data representing a plurality of arranged barcodes is known from a cite of the Internet indicated below, which is known as FULFILLMENT by AMAZON®. <https://images-na.ssl-images-amazon.com/images/G/09/rainier/fba-help/quickguide/3_ItemLabel.pdf>

SUMMARY

According to the conventional art mentioned above, it is possible to print objects on the label sheet. It is noted that the object may be printed not only on the item label but also the delivery label. Thus, it is desired that objects may be printed on the printing sheet appropriately depending on usages.

According to aspects of the present disclosures, there is provided a non-transitory computer-readable recording medium for an information processing apparatus provided with a communication interface, an input interface, a controller, the controller being configured to read an application which is capable of outputting image data. The recording medium contains print data generating instructions which cause, when executed by the controller, the information processing apparatus to perform a first identifying process of identifying usage of an extract-printing image based on identifying data identifying usage of the extract-printing image, the controller receiving, in the first identifying process, the identifying data through the input interface, the extract-printing image being an image printed in an extract-printing process of extracting a part of an image and printing the extracted image, a receiving process of receiving the image data output by the application, an extracting process, in which, in case where the image data received in the receiving process represents an image of which image size is a first size, when the usage identified in the first identifying process is a first usage, the controller extracts, in the extracting process, object image data representing a first object included in the image data received in the receiving process, and when the usage identified in the first identifying process is a second usage different of the first usage, the controller extracts object image data representing a second object included in the image data received in the receiving process. The print data generating instructions further cause, when executed by the controller, the information processing apparatus to perform a generating process, in which when the object image data representing the first object is extracted in the extracting process, the controller generates image data causing a printer connected to the information processing apparatus through the communication interface to print an image composed such that the first object is arranged on a sheet having a second size different from the first size in accordance with the first procedure, and when the object image data representing the second object is extracted in the extracting process, the controller generates image data causing the printer to print an image composed such that the second object is arranged on the sheet having the second size in accordance with a second procedure different from the first procedure. The print data generating instructions which further cause, when executed by the controller, the information processing apparatus to perform an outputting process of outputting the print data which is generated in the generating process and to be transmitted to the printer through the communication interface.

According to aspects of the present disclosures, there is provided A non-transitory computer-readable recording medium for an information processing apparatus provided with a communication interface, an input interface, a controller, the controller being configured to read an application which is capable of outputting image data, the recording medium containing print data generating instructions which cause, when executed by the controller, the information processing apparatus to perform a size identifying process of receiving identifying data used to identify a sheet size of a sheet to be used for printing through the input interface and identifying the sheet size used for printing based on the received identifying data, a receiving process of receiving the image data output by the application, an extracting process of extracting an object image data such that, in case where the image data received in the receiving process represents an image of which image size is a first size, when the sheet size identified in the size identifying process is a size different from the first size and a size identifiable based on first identifying data, the controller extracts, in the extracting process, object image representing first object included in the image data received in the receiving process is extracted; and when the sheet size identified in the size identifying process is a size different from the first size and a size identifiable based on second identifying data different from the first identifying data, the controller extracts, in the extracting process, object image representing second object included in the image data received in the receiving process. The print data generating instructions which further cause, when executed by the controller, the information processing apparatus to perform a generating process in which, when the controller extracts, in the extracting process, image data representing a first object, the controller generates print data used to cause the printer, which is connected to the information processing apparatus through the communication interface, to print an image composed such that the first object is arranged on the sheet having a size identified by the first identifying data in accordance with a first procedure, and when image data representing a second object is extracted in the extracting process, the controller generates the print data used to cause the printer to print an image composed such that the second object is arranged on the sheet having a size identified by the second identifying data in accordance with a second procedure different from the first procedure. The print data generating instructions further cause, when executed by the controller, the information processing apparatus to perform an outputting process of outputting the print data which is generated in the generating process and to be transmitted to the printer through the communication interface.

According to aspects of the present disclosures, there is provided An information processing apparatus provided with a communication interface, an input interface, a storage and a controller, the controller being configured to read an application which is capable of outputting image data, the storage containing print data generating instructions which cause, when executed by the controller, the information processing apparatus to perform a first identifying process of identifying usage of an extract-print image based on identifying data identifying usage of the extract-printing image, the controller receiving, in the first identifying process, the identifying data through the input interface, the extract-print image being an image printed in an extract-printing process of extracting a part of an image and printing the extracted image, a receiving process of receiving the image data output by the application, an extracting process, in which, when the image data received in the receiving process represents an image of which image size is a first size, when the usage identified in the first identifying process is a first usage, the controller extracts object image data representing a first object included in the image data received in the receiving process, and when the usage identified in the first identifying process is a second usage different of the first usage, the controller extracts object image data representing a second object included in the image data received in the receiving process. The controller further performs a generating process, in which, when the object image data representing the first object is extracted in the extracting process, the controller generates image data causing a printer connected to the information processing apparatus through the communication interface to print an image composed such that the first object is arranged on a sheet having a second size different from the first size in accordance with the first procedure, and when the object image data indicating the second object is extracted in the extracting process, the controller generates image data causing the printer to print an image composed such that the second object is arranged on the sheet having the second size in accordance with the first procedure. The controller further performs an outputting process of outputting the print data which is generated in the generating process and to be transmitted to the printer through the communication interface.

According to aspects of the present disclosures, there is provided A method of controlling an information processing apparatus provided with a communication interface, an input interface, a storage and a controller, the controller being configured to read an application which is capable of outputting image data, the storage containing print data generating instructions which cause, when executed by the controller, the information processing apparatus to perform the method by performing identifying usage of an extract-printing image based on identifying data identifying usage of the extract printing image, the identifying data being received through the input interface, the extract-printing image being an image printed by extracting a part of an image and printing the extracted image, receiving the image data output by the application, in case where the image data as received represents an image of which image size is a first size, when the usage as identified is a first usage, extracting object image data representing a first object included in the image data as received, and when the usage as identified is a second usage different from the first usage, extracting object image data representing a second object included in the image data as received. The method further performs generating image data such that when the object image data representing the first object is extracted, generating image data causing a printer connected to the information processing apparatus through the communication interface to print an image composed such that the first object is arranged on a sheet having a second size different from the first size in accordance with the first procedure, and when the object image data representing the second object is extracted, generating image data causing the printer to print an image composed such that the second object is arranged on the sheet having the second size in accordance with the first procedure. The method further performs outputting the print data as generated and to be transmitted to the printer through the communication interface.

BRIEF DESCRIPTION OF THE ACCOMPANYING DRAWINGS

FIG. 11 shows another projection histogram which is used when delivery label image location information is identified.

DETAILED DESCRIPTION OF THE ILLUSTRATIVE EMBODIMENT

Figure 1:
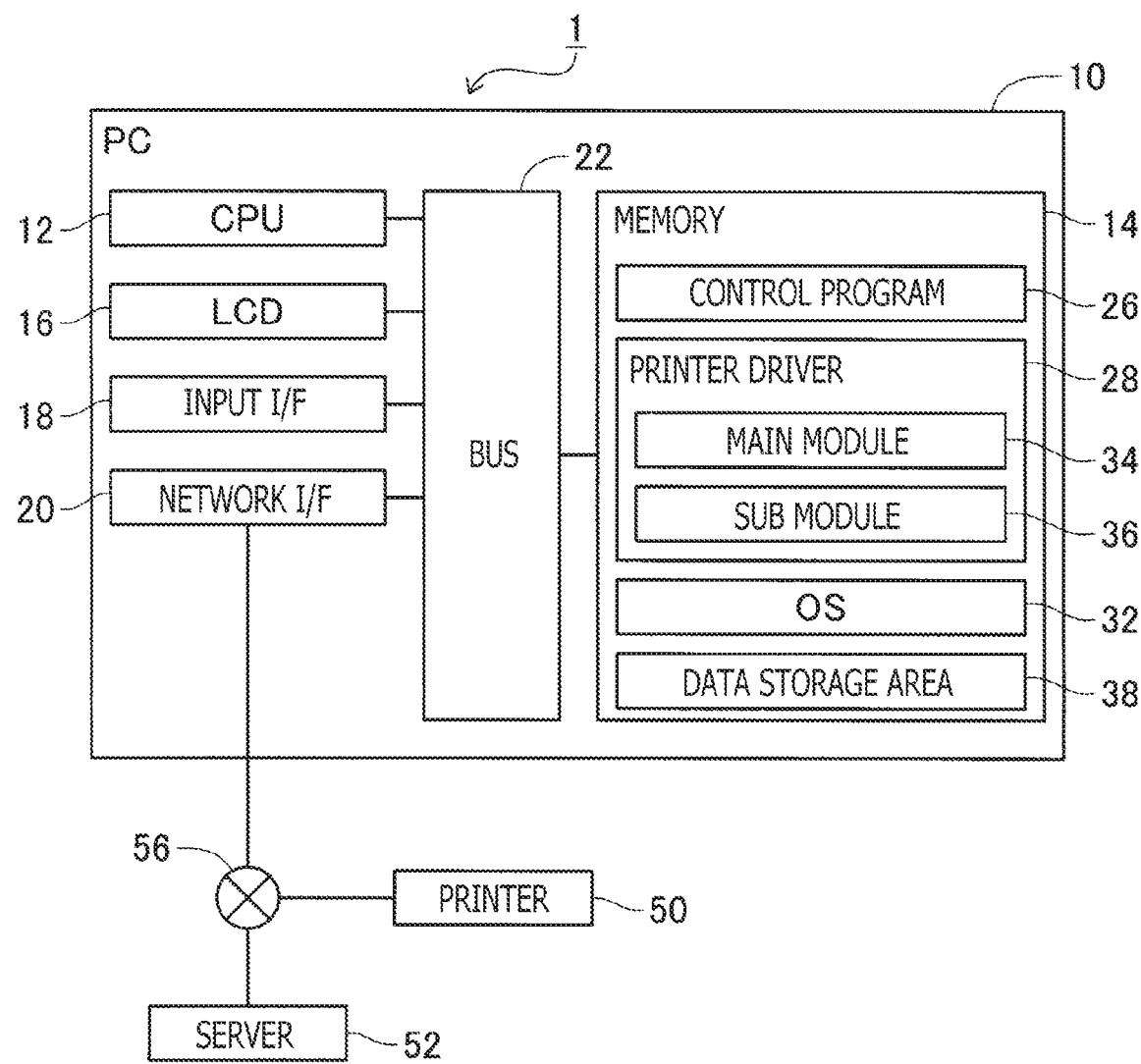
FIG. 1 is a block diagram of a communication system according to an illustrative embodiment of the present disclosures.

FIG. 1 shows a communication system 1 according to an illustrative embodiment of the present disclosures. The communication system 1 includes a PC (which is an example of an information processing apparatus) 10, a printer (which is an example of a printer) 50 and a server 52.

The PC 10 mainly includes a CPU (which is an example of a controller) 12, a memory 14, an LCD (which is an example of a displaying interface) 16, an input I/F (which is an example of an input/output I/F) 18 and a network I/F (which is a communication interface) 20, which are communicatably interconnected through a bus 22.

The PC 10 is configured to communicate with a printer 50 through the network I/F 20 and a network 56. As a communication method, a wired LAN, a USB, Wi-Fi®, Bluetooth® and the like can be employed. The printer 50 is a device configured to print images on label sheets. The printer 50 exchanges, with the PC 10, various pieces of information and instruction signals. The printer 50 performs a printing operation to print desired texts and objects (e.g., images) on the label sheets under control of the PC 10.

According to the embodiment, the printer 50 is dedicated to perform a label printing and is not configured to print images on cut sheets such as A4 sheets, B4 sheets or the like. Further, the network OF 20 is connected to a server 52 through the network 56. According to the above configuration, the PC 10 exchanges information with the server 52 through the network 56.

The CPU 12 performs the processes in accordance with a control program (which is an example of an application) 26 stored in the memory 14, the printer driver 28 and the OS 32. The control program 26 is a program for browsing and printing files having particular formats (e.g., PDF files). An example of the control program 26 is Adobe Reader®. The printer driver 28 is a device driver for the printer 50, and controls the printer 50 to perform various operations. It is noted that the printer driver 28 includes a main module 34 and a sub module 36. The main module 34 performs creation of the printing image data (describe in detail later), and the sub module 36 performs an image extraction process and the like. The OS 32 is a program providing basic functions utilized by the control program 26 and the printer driver 28. It is noted that the CPU 12 executing the printer driver 28 and the like will be referred to simply by the name of the programs. For example, an expression "the printer driver 28 performs . . . " may be used to mean "the CPU 12 executing the printer driver 28 performs . . . ".

The memory 14 includes a data storage area 38. The data storage area 38 is an area to store data necessary for executing the printer driver 28. It is noted that the memory 14 is configured by combining a RAM, a ROM, a flash memory, an HDD, a buffer provided to the CPU 12 and the like.

It is noted that the memory 14 may be a computer-readable storage medium. The computer-readable storage medium is a non-transitory medium. The non-transitory medium includes, in addition to the computer-readable storage medium above, a recording medium such as a CD-ROM, a DVD-ROM and the like. It is also noted that the non-transitory medium is a tangible medium. In contrast, an electrical signal carrying programs downloaded from a server on the Internet or the like is a computer-readable signal medium, which is one type of a computer-readable medium, is not included in the non-transitory computer-readable storage medium.

The LCD 16 is configured to display various pieces of information regarding the PC 10. It is noted that the display need not be limited to the LCD, but other types of displays (e.g., an organic EL display) may be employed. The input I/F 18 is an interface through which user operations are input. The input I/F 18 includes keyboard, a mouse and the like. The input I/F 18 may be a touch panel integrally provided onto a displaying surface of the LCD 16.

In the specification, processes of the CPU 12 according to the instructions described in programs will be mainly described. That is, processes to "judge," "extract," "select," "calculate," "determine," "identify," "specify," "obtain," "receive," "control" and the like are those performed by the CPU 12. It is noted that the processes performed by the CPU 12 may include control of hardware through the OS 30. It is also noted that the term "obtain" is used to mean a concept which does not necessarily include a concept of requesting. That is, a process of the CPU 12 to receive data without requesting therefor is also included in a concept that "the CPU 12 obtains data."

The communication system 1 is configured to perform printing of item labels which are used for a service provided by a service providing company. FULFILMENT by AMAZON® is an example of such a service.

Concretely, the server 52 is run by a service providing company. The PC 10 operated by the user accesses the server 52 and obtains image data of an image to be printed on the sheet having a size of a label (hereinafter, referred to as a label sheet). Examples of the image to be printed on the label sheet include, an item label image 70 shown in FIG. 2 (which is an example of a first object) and a delivery label image 80 shown in FIG. 3 (which is another example of the first object).

Figure 2:
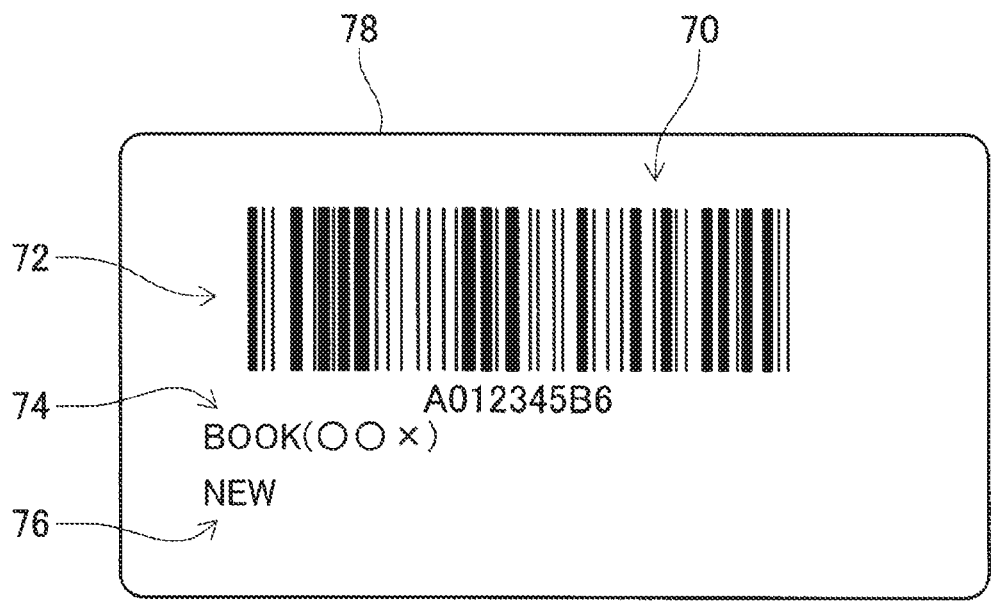
FIG. 2 shows an example of an item label.

The item label image 70 is used for identifying the items (which is an example of a second usage). As shown in FIG. 2, the item label image 70 contains a barcode 72 which is a code indicating information intrinsic to the item, a name of the item (hereinafter, referred to as an item name) 74 and a condition of the item (hereinafter, referred to as an item condition) 76. The item label image 70 is printed on the label sheet. The label sheet on which the item label image 70 has been printed (hereinafter, referred to as an item label 78) is then adhered onto the item. As the barcode 72 of the item label image 70 of the item label 78 adhered onto the item is scanned by an image scanner, the item is identified based on the item label image 70. It is noted that various types of generally used scanners capable of analyzing a barcode or various barcode scanners dedicated to scan barcodes may be used as the image scanner for reading the item label 78.

Figure 3:
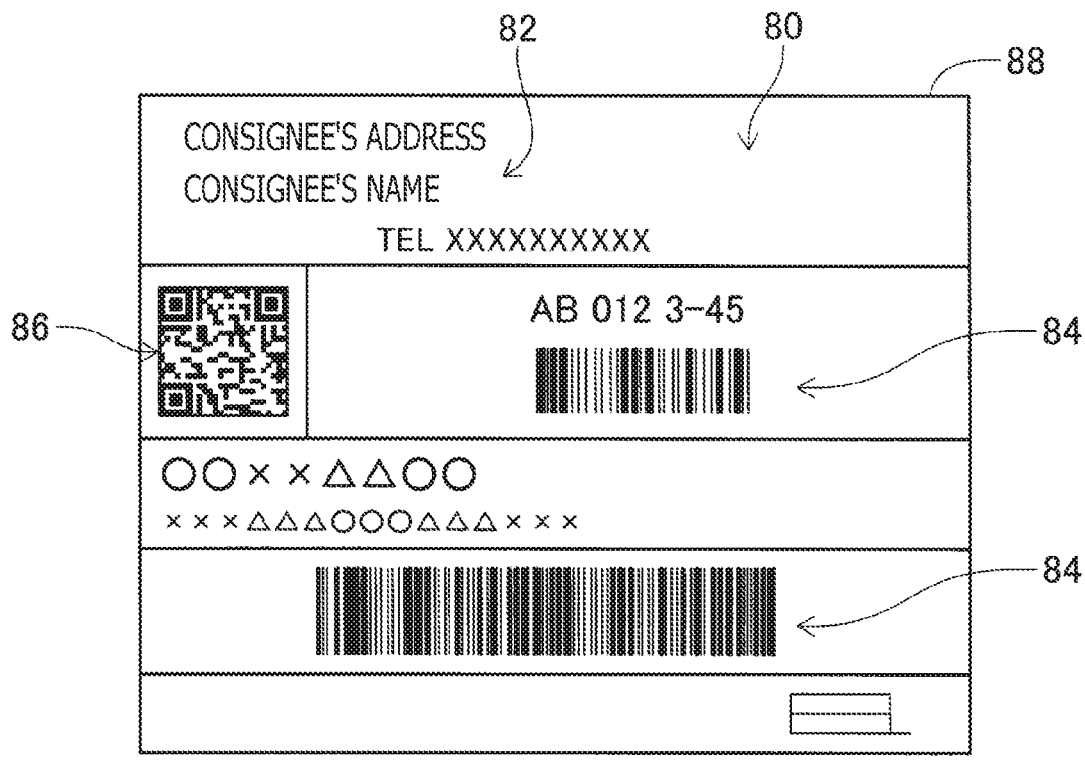
FIG. 3 shows an example of a delivery label.

The delivery label image 80 is used for delivering items (an example of a first usage) and contains, as shown in FIG. 3, delivery destination information 82 representing a destination (e.g., a consignee's address and a consignee's name) to which the item is to be delivered, a plurality of barcodes 84 indicating information intrinsic to the item and a QR Code® 86. The delivery label image 80 is printed on the label sheet, and the label sheet on which the delivery label image 80 has been printed (hereinafter, referred to as a delivery label 88) is adhered onto a package of the item, thereby destination of the item being recognizable based on the delivery label image 80. Further, as the barcode 84 of the delivery label image 80 is read by an image scanner, the information intrinsic to the item can be obtained. It is noted that the delivery label image 80 contains delivery information 82 including, for example, the consignee's address (i.e., the address of the delivery destination). Therefore, the delivery information 82 is indicated largely to some extent so that the address and the like are correctly identified by the delivery information. Therefore, the delivery label image 80 is relatively large in comparison with the item label image 70.

Figure 4:
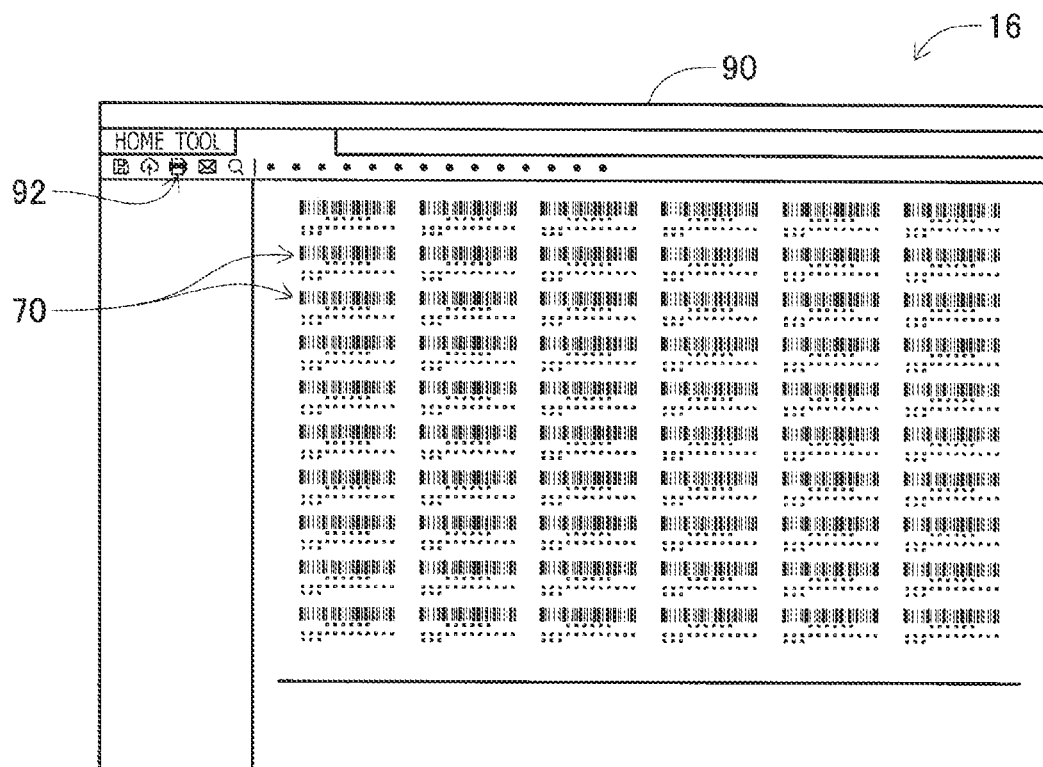
FIG. 4 is an example of a label image displaying screen on which a plurality of item labels is displayed.

When the user needs the item label 78, the user uses the PC 10 to obtain the image data of the item label image 70 from the server 52. The image data obtained from the server 52 is typically PDF format image data, and the control program 26 is an application configured to display the image data of the PDF format. Accordingly, based on the PDF format image data obtained from the server 52, the control program 26 displays a label image display screen 90 on the LCD 16 as shown in FIG. 4. It is noted that the PC 10 has already obtained image data of an A4 size sheet (hereinafter, referred to as A4 size image data) from the server 52. The A4 size image data includes image data of a plurality of item label images 70. Therefore, on the label image display screen 90, a plurality of item label images 70 are displayed.

Figure 5:
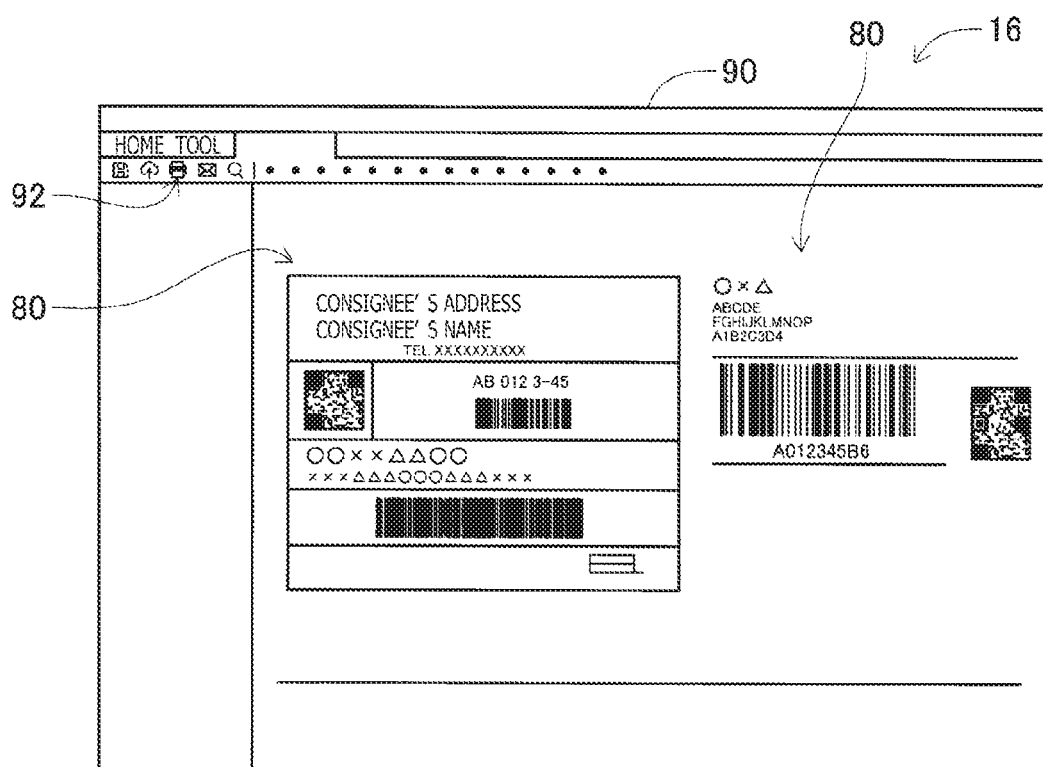
FIG. 5 is an example of a label image displaying screen on which the delivery label image is displayed.

When the user needs the delivery label 88, the user uses the PC 10 to obtain the image data of the delivery label image 80 from the server 52. Then, the control program 26 displays the label image display screen 90 on the LCD 16, as shown in FIG. 5, based on the image data of the delivery labels 88 obtained from the server 52. It is noted that the PC 10 has obtained the A4 size image data, which contains image data of two delivery label images 80 (see FIG. 5). Therefore, two delivery label images 80 are displayed on the label image display screen 90.

Further, on one label sheet, one item label image 70 or one delivery label image 80 is normally printed as shown in FIGS. 2 and 3. On the other hand, the PC 10 has A4 size image data which is an A4 size image containing a plurality of item label images 70 or A4 size image data which is an A4 size image containing a plurality of delivery label images 80 from the server 52. Therefore, it is necessary to extract image data of one item label image 70 or one delivery label image 80 from the A4 size image data.

Therefore, in the PC 10, the printer driver 28 performs an process of extracting a part of an image and printing the extracted image, that is, a so-called a crop-printing process (which is an example of an extract-print process). It is noted that, in the following description, the processes performed by the printer driver 28 will be described in detail referring to the flowcharts shown in FIGS. 12-14.

Figure 6:
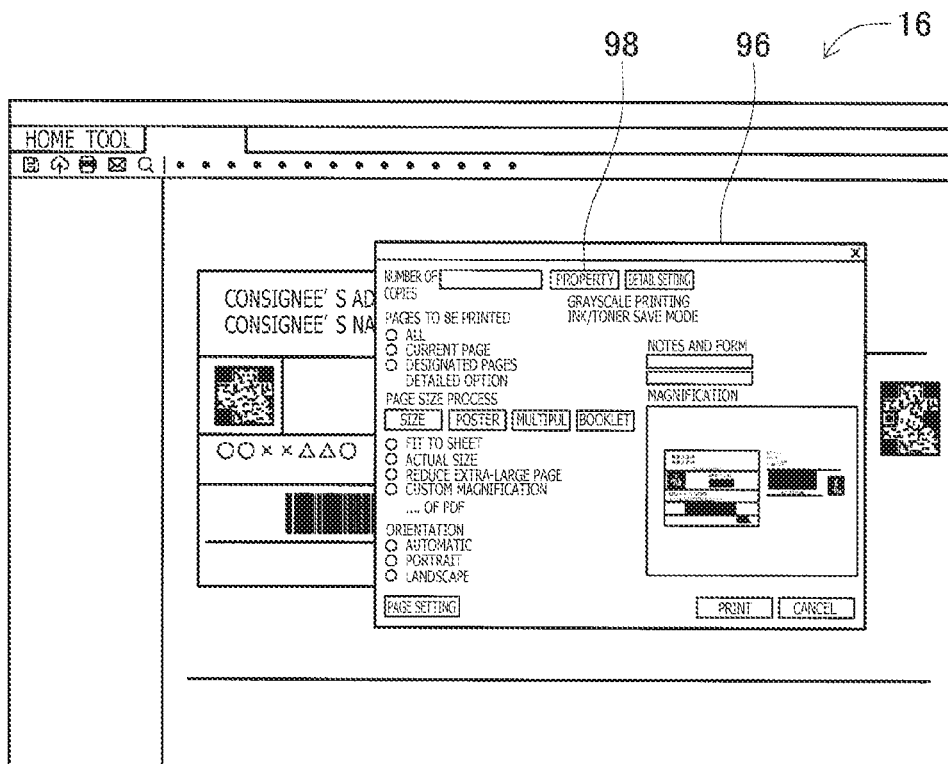
FIG. 6 shows an example of an APP-compliant setting screen.
Figure 7:
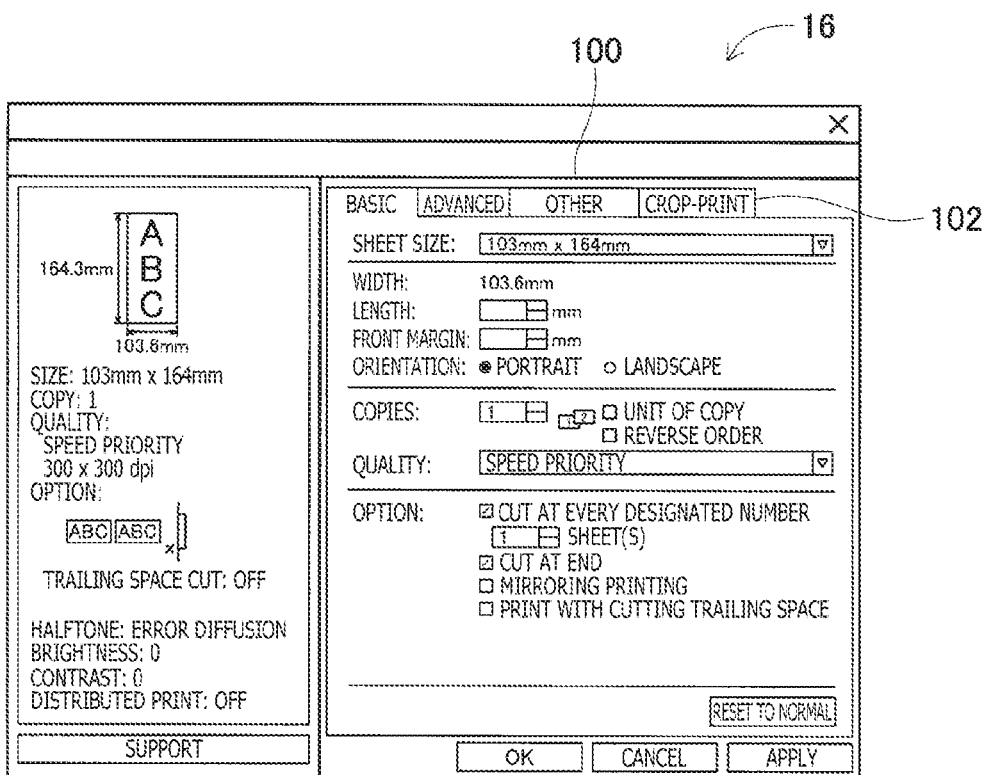
FIG. 7 shows an example of a driver-compliant first setting screen.

When a print button 92 in the label image display screen 90 is operated (see FIG. 4 or 5), the control program 26 displays an APP-compliant setting screen 96 as shown in FIG. 6 on the LCD 16. Then, when a property button 98 on the APP-compliant setting screen 96 is operated, the control program 26 calls an API (S100: YES) and the printer driver 28 is requested to display a setting screen. In response to the request, a main module 34 of the printer driver 28 displays a driver-compliant first setting screen 100 as shown in FIG. 7 on the LCD 16 (S102).

Figure 8:
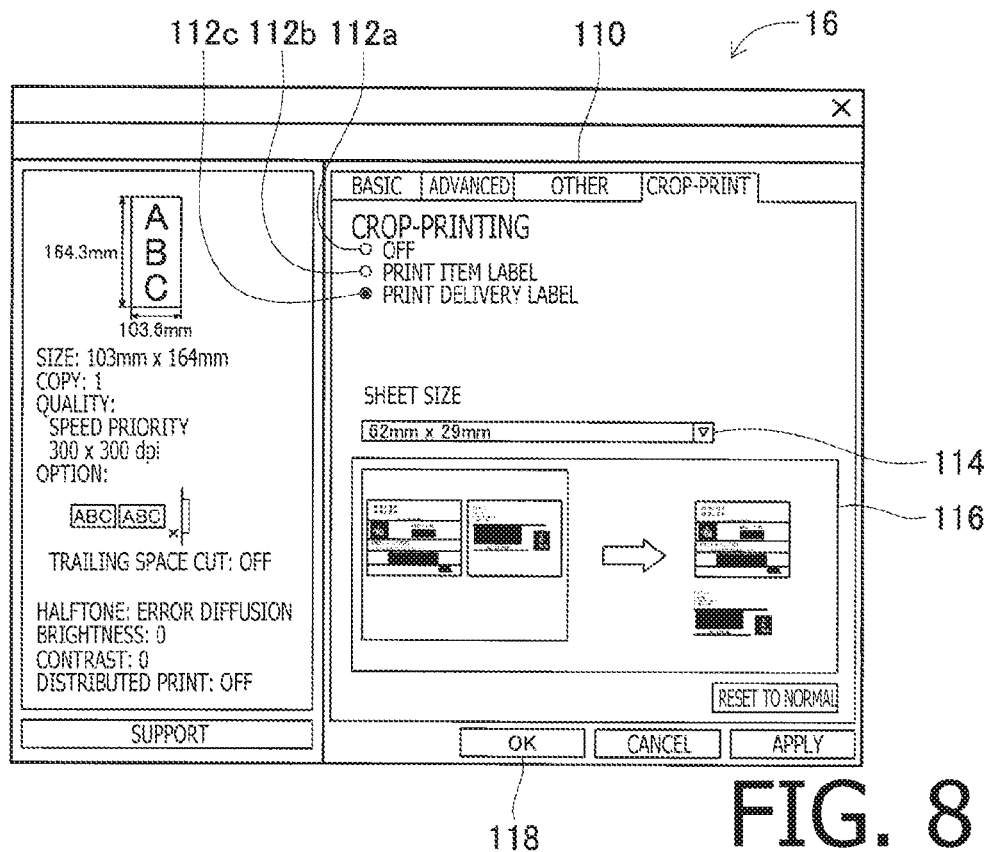
FIG. 8 shows an example of a driver-compliant second setting screen.

The driver-compliant first setting screen 100 is a screen used to make basic settings in the printing process. On the driver-compliant first setting screen 100, various setting buttons for setting sheet size and the like are displayed. As the user operates the setting buttons, basic printing conditions are set. Further, on the driver-compliant first setting screen 100, a crop-print tab 102 is also displayed. When the crop-print tab 102 is operated (S104: YES), the main module 34 of the printer driver 28 displays a driver-compliant second setting screen 110 as shown in FIG. 8 on the LCD 16 (S106).

The driver-compliant second setting screen 110 is a screen through which the user inputs print setting information for the crop-printing process performed by the printer 50. On the driver-compliant second setting screen 110, radio buttons 112a, 112b and 112c (which will also be collectively referred to as radio buttons 112) used to set the crop-printing process, a size setting button 114 used to input the size of the label sheet, a print image 116 of the label image to be printed in the crop-printing process and the like.

It is noted that the radio buttons 112 displayed on the driver-compliant second setting screen 110 include the radio button 112a for selecting a normal printing process (not the crop-printing process), the radio button 112b for selecting a printing process of the item label image 70 as the crop-printing process (which is an example of a second extract printing process) and the radio button 112c for selecting a printing process of the delivery label image 80 as the crop-printing process (which is an example of a second extract printing process). When the size setting button 114 is operated, a pull-down menu is displayed. In the pull-down menu, sizes of the label sheets usable in the printing process selected by the radio buttons 112 are displayed. As the user selects a desired sheet size from the sizes displayed on the pulldown menu, the size of the sheet to be used in the printing process is set.

When the radio button 112a is operated, the normal printing process is performed. In the normal printing process, the size of the sheet is not limited as far as the sheet is usable in the printer 50. Therefore, when the radio button 112a is operated, the sizes of the printing sheets on which the printer 50 can print images are indicated on the pulldown menu. The sizes of the printing sheets in this case include, for example, "58 mm," "102 mm," "50 mm×85 mm," "60 mm×92 mm," "102 mm×50 mm" "102 mm×102 mm" and "102 mm×102 mm"

When the radio button 112c is operated, the crop-printing process of the delivery label image 80 (hereinafter, referred to as a delivery label printing process) is performed. The delivery label image 80 to be printed in the delivery label printing process is a relatively large image as mentioned above. Accordingly, when the size of the label sheet is small, the delivery label image 80 cannot be printed thereon. Therefore, in the delivery label printing process, the sheet size settable in the print setting is limited to a particular size or more. According to the illustrative embodiment, the size of the printing sheet usable in the delivery label printing process is limited to one, of which width is four inches or more. Therefore, when the radio button 112a is operated, on the pulldown menu, the sheet sizes are displayed such that the sheet of which width is less than four inches are excluded. That is, the size displayed on the pulldown menu in this case are "102 mm," "102 mm×50 mm," "102 mm×102 mm" and "102 mm×152 mm." According to this configuration, it is avoided that the sheets on which the delivery label image 80 cannot be printed are selected.

When the radio button 112b is operated, the crop-printing process of the item label image 70 (hereinafter, referred to as an item label printing process) is performed. The item label image 70 to be printed in the item label printing process is, as mentioned above, an image smaller than the delivery label image 80. Therefore, in the item label printing process, as in the normal printing process, there is no limitation regarding the size of the printing sheet as far as the printer 50 can print images on the sheet. Accordingly, when the radio button 112b is operated, the sizes of the printing sheets indicated below is displayed on the pulldown menu. That is, the sizes indicated in the pulldown menu include, for example, "58 mm," "102 mm," "50 mm×85 mm," "60 mm×92 mm," "102 mm×50 mm" "102 mm×102 mm" and "102 mm×102 mm."

Figure 9:
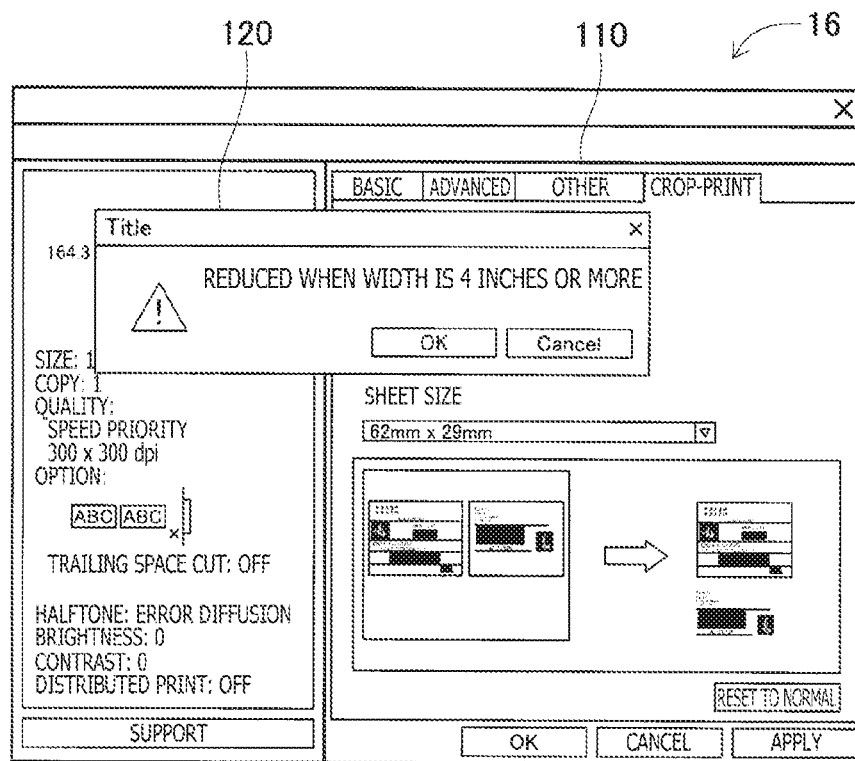
FIG. 9 shows an example of a notification screen.

When the radio button 112c is operated, the delivery label printing process is performed. It is noted that the delivery label image 80 printed in the delivery label printing process is, as mentioned above, a relatively large image. Therefore, when the delivery label printing process is performed, the size of the label sheet which can be set to the printer 50 is limited to one of which width is four inches in width or more. Even if the size of the label sheet is four inches in width, there could be a case where the size of the delivery label image 80 is larger than a printing area of the label sheet. In such a case, the delivery label image 80 is reduced and printed on the label sheet. Because of this configuration, when the radio button 112c is operated, as shown in FIG. 9, a notification screen 120 indicating that the delivery label image 80 is larger than the size of the label sheet and will be printed in a reduced manner on the LCD 16. Accordingly, the user can recognize, in advance, that the delivery label image 80 which is larger than the label sheet will be printed on the delivery label sheet in a reduced manner In the driver-compliant second setting screen 110, when the OK button 118 is operated after a printing process is selected in response to operation of the radio button 112 and setting of the sheet size is done in response to operation of the size setting button 114, the printer driver 28 requests the control program 26 for the image data representing an image having a size corresponding to the selected printing process. Concretely, the printer driver 28 outputs size information indicating the size corresponding to the selected printing process to the control program 26 through the OS 32. It is noted that the printer driver 28 does not need to output a command explicitly indicating a "request." The control program 26 transmits the image data representing an image of which size is equal to one indicated by the size information to the printer driver 28. Alternatively, the control program 26 may transmit the image data to the printer driver 28 in accordance with the size information output by the printer driver 28 not through the OS 32.

Specifically, when the radio button 112a is operated, the normal printing process is performed. In the normal printing process, the image extraction process is not performed, and the printer drive 28 prints the image represented by the image data obtained from the control program 26 on the label sheet. Therefore, when the radio button 112a is operated (S108: NO), the main module 34 of the printer driver 28 requests the control program 26 for the image data of which size (an example of a second size) is the size of the label sheet set based on the operation of the size setting button 114 (S110). At this stage, the main module 34 outputs information indicating the printing process selected based on the user operation, that is, the normal printing process selected by the operation of the radio button 112a as well as the request for the image data having the size same as the label size to the control program 26.

When receiving the request from the printer driver 28, the control program 26 transmits the image data corresponding to the size of the label sheet in accordance with the request to the printer driver 28. At this stage, the control program 26 generates image data converted to vector format image data which can be interpreted by the printer driver 28 based on the PDF format image data obtained from the server 52 to the printer driver 28 through the OS 32. Further, the control program 26 also transmits, together with the image data, information representing a printing process in which the image data is subjected to be printed (hereinafter, such information being referred to as subject process information: which is an example of particular data) to the printer driver 28. That is, the control program 26 outputs image data and the subject process information indicating that the printing process in which the image data is subjected to be processed is the normal printing process to the printer driver 28. It is noted that the control program 26 may output bitmap format image data to the printer driver 28.

When the radio button 112b or 112c is operated in the driver-compliant second setting screen 110, the crop-printing process is performed. In the crop-printing process, the label image is extracted from the image which the PC 10 obtained from the server 52, and the extracted label image is printed on the label sheet. Therefore, when the radio button 112b or 112c is operated, the main module 34 of the printer driver 28 request the control program 26 for the image data corresponding to the image size the PC 10 obtained from the server 52.

The PC 10 obtains the image data of the A4 size image from the server 52 as described above. It is noted that there could be a case where the PC 10 obtains the image data of a latter size image from the server 52. Therefore, the main module 34 request for the image data corresponding to the size covering both the A4 size image and the Letter size image. It is noted that the dimension of the A4 size is 210 mm×297 mm, while the dimension of the Letter size is 215.9 mm×279.4 mm Accordingly, the dimension which covers both the A4 size and the Letter size is 215.9 mm×297 mm (hereinafter, referred to as an A4-Letter size). Thus, when the radio button 112b or 112c is operated (S108: YES), the main module 34 request for the image data representing an image of the A4-Letter size (which is an example of a first size) (S112). At this stage, the main module 34 also outputs information indicating the crop-printing process selected by the operation of the radio button 112b or 112c (i.e., information indicating the item label printing process or the delivery label printing process) to the control program 26 as well as the request for the A4-Letter size image data. Then, the control program 26 receives request for the information indicating the designated crop-printing process as well as the A4-Letter size image data.

Then, in response to the request, the control program 26 transmits the image data of the A4-Letter size printing sheet to the printer driver 28. At this stage, the control program 26 outputs, to the printer driver 28, the image data, which is the vector format image data that can be interpreted by the printer driver 28, is converted from the PDF format image data obtained from the serve 52. Further, the control program 26 also transmits information obtained from the printer driver 28 and indicating the process is the item label printing process or the delivery label printing process to the printer driver 28 as the subject process information as well as the image data.

Then, after receiving the vector format image data from the control program 26 (S200), the main module 34 of the printer driver 28 requests the OS 32 to convert the vector format image data to the bitmap format image data (S202). Upon receipt of the request, the OS 32 converts the vector format image data to the bitmap format image data and outputs the converted image data to the printer driver 28. As above, the printer driver 28 receives the bitmap format image data (S204). That is, the image data suitable for outputting to the OS 32 is transmitted from the control program 26 to the OS 32, the OS 32 converts the received image data to the image data suitable for outputting to the printer driver 28, and the printer driver 28 receives the thus converted image data. Receipt of the image data and receipt of the image data associated with a data converting process described above, via the OS 32, are examples of a mode of receipt of the image data, which is transmitted from the control program 26, by the printer driver 28.

Next, when receiving the bitmap format image data, the main module 34 of the printer driver 28 determines whether the received image data (hereinafter, referred to as reception data) is subjected to the crop-printing process (S206). This decision is performed based on the subject process information which is received together with the reception data. When it is determined that the reception data is not subjected to the crop-printing process (S206: NO), that is, when the subject process information indicates the normal printing process, the main module 34 determines whether the reception data is the label sheet size image data (S207). When it is determined that the reception data is not the label size image data (S207: NO), since the normal printing process cannot be performed with the data, an error process will be performed (S208). When it is determined that the reception data is the label sheet size image data (S207: YES), the main module 34 generates printing image data based on the reception data (S209). Then, the main module 34 transmits the thus created printing image data to the printer 50 (S210). Then, in the printer 50, the normal printing process is performed.

When it is determined that the reception data is subjected to the crop-printing process (S206: YES), that is, when the subject process information indicates at least one of the delivery label printing process and the item label printing process, the main module 34 of the printer driver 28 determines whether the reception data is the A4-Letter size image data (S211). When it is determined that the reception data is not the is not the A4-Letter size image data (S211: NO), since the crop-printing process cannot be performed, an error process will be performed (S208). When it is determined that the reception data is the A4-Letter size image data (S211: YES), the main module 34 determines whether the reception data is subjected to the delivery label printing process (S212). It is noted that this decision is made based on the subject process information received together with the reception data.

When the reception data is not subjected to the delivery label printing process (S212: NO), that is, when the subject process information indicates the item label printing process, the sub module 36 of the printer driver 28 identifies information regarding a position of the item label image 70 in the image represented by the reception data (hereinafter, the position will be referred to as item label position information (S214).

That is, the sub module 36 firstly analyzes bitmap format reception data and detects the image data indicating the barcode 72. Then, the sub module 36 obtains the position information indicating a position of the image of the barcode 72 as detected as the position information indicating the barcode 72 contained in the item label image 70. Then, the sub module 36 operates an offset amount of the barcode 72. That is, the offset amount is defined as a positional coordinate of one of four vertexes of the barcode 72 with respect to one of four vertexes (e.g., an upper left vertex) of a rectangular image represented by the bitmap format image data is calculated. In the printer driver 28, a width dimension and a height dimension of the item label image 70 are input in advance. Therefore, the sub module 36 identifies item label image position information which indicates positional coordinate of the referential vertex among the four vertexes of the item label image 70 with respect to the referential vertex of the rectangular image indicated by the bitmap format image based on the offset amount of the barcode 72 and the width dimension and the height dimension of the item label image 70. At this stage, if the item label image position information cannot be identified (S216:NO), an error process is performed (S208).

When the reception data is subjected to the delivery label printing process (S212: YES), that is, when the subject process information indicates the delivery label printing process, the sub module 36 of the printer driver 28 identifies information regarding the position of the delivery label image 80 within the image represented by the reception data (hereinafter, referred to as delivery label image position information) (S218). Specifically, the sub module 36 firstly analyzes the bitmap format reception data and detects the image data representing a barcode 84 and a QR code 86. Thereafter, the sub module 36 obtains the position information indicating a position of the image represented by the image data as detected as the position information indicating positions of the barcode 84 and the QR code 86 contained in the delivery label image 80.

Figure 10:
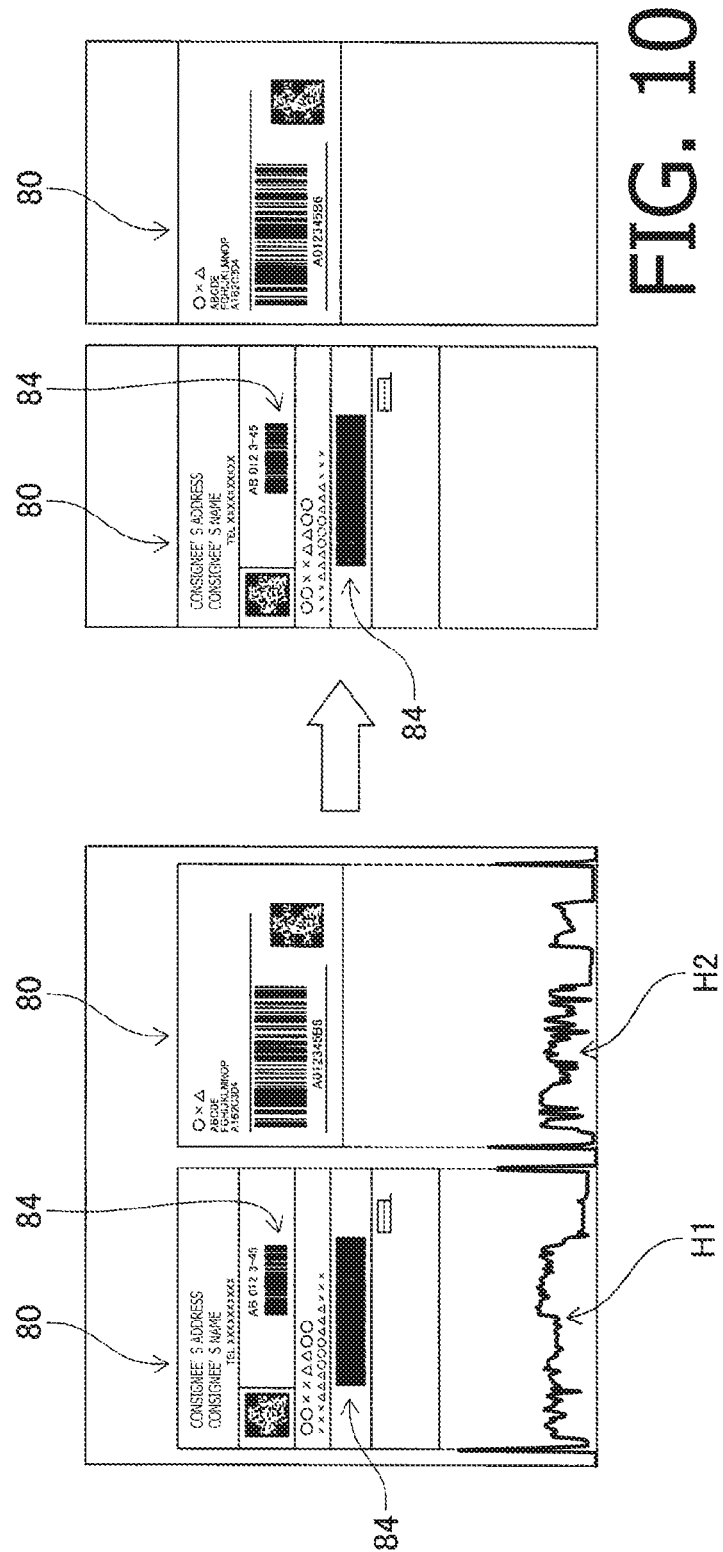
FIG. 10 shows a projection histogram which is used when delivery label image location information is identified.

The sub module 36 detects a direction where bars constituting the barcode 84 extend based on the image data of the barcode 84 as detected. Then, as shown in FIG. 10, the sub module 36 generates projection histograms H1 and H2 in a direction perpendicular to the direction where the bars of the barcode 84 extend. In this case, the projection histogram in the direction perpendicular to the extending direction of the bars is analyzed, and a continuous portion where the number of detections is zero has a particular length (e.g., a length corresponding to 50 dots), the portion where the number of detections is zero is regarded as a portion where the delivery label image 80 does not exist. Accordingly, in the image shown in FIG. 10, it is presumed that the delivery label image 80 does not exist within a central portion, while the delivery label image 80 exists within each of right and left portions.

Next, the sub module 36 generates a projection histogram H3 in the direction where the bars of the barcode 84 extend for each area in which the delivery label image 80 is presumed to exist as shown in FIG. 11. It is noted that, in FIG. 11, the projection histogram H3 corresponding to a left-side one of the areas where the delivery label image 80 shown in FIG. 10 is presumed to be exist. Then, the sub module 36 detects an upper end and a lower end of the delivery label image 80 based on the projection histogram, and identifies delivery label image position information based on the upper and lower ends of the delivery label image 80.

As described above, when the delivery label image position information is identified by the sub module 36, the sub module 36 extracts the image data of the delivery label image 80 from the reception data based on the delivery label image position information (S220). Next, the sub module 36 determines whether the delivery label image 80 represented by the extracted image data can be printed within the printing area of the label sheet selected by the user (S222). It is noted that the size of the label sheet selected by the user is the size selected as the user operated the size setting button 114 on the driver-compliant second setting screen 110. When it is determined that the delivery label image 80 can be printed within the printing area of the label sheet selected by the user (S222: YES), the delivery label image 80 is stored in the data storage area 38 (S225).

When it is determined that the delivery label image 80 cannot be printed within the printing area of the user-selected label sheet (S222: NO), the sub module 36 reduces the delivery label image 80 within a range where quality of the barcode can be maintained (S224). In other words, the sub module 36 reduces the delivery label image 80 to maintain the image quality of the reduced barcode 84 and the reduced QR code 86 so that code information can still be readable from the reduced images. It is noted that the size with which the image quality is maintained is the size designed, in advance, by the vender of the printer driver 28 such that the code information can be read with the image scanner even if the delivery label image 80 has been reduces. It is noted that a reduction ratio of the barcode may be limited so that the delivery label image 80 is reduced at a particular reduction ratio or larger. Alternatively, the delivery label image 80 may be reduced such that the thinnest one of the plurality of bars constituting the barcode has a particular size or more. Alternately or optionally, the delivery label image 80 may be reduced such that the thickest one of the plurality of bars constituting the barcode has a particular size or more.

When the delivery label image 80 is reduced, the size of the barcode 84 and the QR code 86 may remain unreduced and only the other objects may be reduced. Alternatively, the barcode 84 and the QR code 86 may also be reduced within a range such that the code information can be read from the reduced barcode 84 or the QR code 86. Then, the reduced delivery label image 80 may be stored in the data storage area 38 (S225).

When the delivery label image position information is identified in the reception data and the image data of the deliver delivery label image 80 is extracted from the reception data, if the delivery label image position information cannot be identified and the delivery label image 80 cannot be extracted (S216: NO), an error process is performed (S208).

When the sub module 36 has identified the item label image position information, that is, when the reception data is subjected to the item label printing process (S226: NO), the main module 34 obtains the item label image position information from the sub module 36, and extracts the image data of the item label image 70 from the reception data based on the obtained item label image position information (S228).

When the delivery label image 80 is extracted by the sub module 36, that is, when the reception data is subjected to the delivery label printing process (S226: YES), the main module 34 obtains information for identifying a storage destination of the delivery label image 80 that is stored in the data storage area 38 by the sub module 36, that is, information necessary for obtaining the delivery label image 80 from the data storage area 38 in which the sub module 36 stored the delivery label image 80, and based on the thus obtained information, the main module 34 obtains the image data of the delivery label image 80 from the data storage area 38 (S229).

That is, when the reception data is subjected to the item label printing process, the sub module 36 identifies the item label image position information and extracts the item label image 70 from the reception data. On the other hand, when the reception data is subjected to the delivery label printing process, the sub module 36 identifies the delivery label image position information and the main module 34 extracts the delivery label image 80 from the reception data.

Next, the main module 34 determines whether the extracted image (e.g., the item label image 70 extracted by the main module 34, the delivery label image 80 extracted by the sub module 36, the delivery label image 80 extracted by the sub module 36 and reduced) can be printed within the printing area of the label sheet of which size is selected in accordance with the user operation (S230). When it is determined that the extracted image cannot be printed within the printing area of the label sheet selected by the user (S230: NO), an error process is performed (S208).

When it is determined that the extracted image can be printed within the printing area of the label sheet selected by the user (S230: YES), the main module 34 generates the printing image data based on the image data of the extracted image (S209). In this case, the printing image data representing an image in which the extracted image is arranged on the label sheet of which size was selected in accordance with the user operation is generated. Then, the main module 34 transmits the thus generated printing image data to the printer 50 (S210). As above, in the printer 50, the crop-printing process, that is, the delivery label printing process or the item label printing process is performed.

It is noted that the process of S106 executed by the CPU 12 is an example of a first display controlling process and a second display controlling process. The processes of S110 and S112 executed by the CPU 12 are examples of a first outputting process. The process of S200 executed by the CPU 12 is an example of a receiving process. The process of S206 executed by the CPU 12 is an example of a second identifying process or a size identifying process. The process of S209 executed by the CPU 12 is an example of a generating process. S210 executed by the CPU 12 is an example of a first identifying process. The processes of S220 and S228 executed by the CPU 12 are examples of an extracting process.

According to aspects of the above-described illustrative embodiment, the following effects can be achieved.

When the size of the image represented by the image data received from the control program 26 is the A4-Letter size and the image to be printed in the crop printing process is to be used for delivering an item, that is, when the crop printing process is the delivery label printing process, the printing image data is generated in accordance with a first procedure. Namely, when the delivery label image 80 cannot be printed within the printing area of the label sheet, the printing image data is generated such that the delivery label image 80 is printed on the label sheet with being reduced.

When the size of the image represented by the image data received from the control program 26 is the A4-Letter size and the image to be printed in the crop printing process is to be used for distinguishing items, that is, when the crop printing process is the item label printing process, the printing image data is generated in accordance with a second procedure. Namely, regardless of whether the item label image 70 can be or cannot be printed within the printing area of the label sheet, the printing image data is generated such that the item label image 70 is printed on the label sheet. Thus, the image corresponding to the usage can be printed appropriately.

It is noted that the printer 50 is not configured to print an image on a cut sheet such as an A4 size sheet, but is configured to print an image on a label size sheet. Further, the printer driver 28 is configured to request the control program 26 for the A4-Letter size image data, and extract the item label image 70 or the delivery label image 80 from the A4-Letter size image data. Accordingly, the crop-printing process can be performed appropriately.

At the normal printing process is performed, the printer driver 28 requests the control program 26 for the label size image data and generates the printing image data based on the label size image data. Thus, the normal printing process can be appropriately performed.

In case where the printing process is the delivery label printing process, when the extracted delivery label image 80 cannot be printed within the printing area of the label sheet of which size has been selected by the user, the printer driver 28 reduces the extracted image, and generates the printing image data based on the reduced image. In case where the crop printing process is the item label printing process, the printer driver 28 generates the printing image data based on the extracted item label image 70 without reducing the same. Accordingly, even the large-size delivery label image 80 can be printed on the label sheet of which size has been selected by the user operation.

When the delivery label image 80 is reduced, the reduction ratio is adjusted so that the image quality of the barcodes 84 contained in the delivery label image 80 is maintained (i.e., the barcodes 84 contained in the reduced delivery label image can still be readable). According to this configuration, readability of the barcodes 84 is guaranteed.

Further, when the driver-compliant second setting screen 110, through which one of the delivery label printing process and the item label printing process can be selected, is displayed on the LCD 16, and when the delivery label printing process is selected on the driver-compliant second setting screen 110, it is determined that the usage of the image to be printed in the printing process is for delivering the items. When the item label printing process is selected on the driver-compliant second setting screen 110, it is recognized that the usage of the image to be printed is for distinguishing the items. That is, the usage of the images to be printed in the printing process is clearly recognized.

Further, the size setting button 114 for setting the size of the printing sheet is displayed on the driver-compliant second setting screen 110. In accordance with the user's operation of the size setting button 114, the printing image data, which is configured such that the item label image 70 or the delivery label image 80 is arranged on the print sheet of which size is selected by the user, is generated. Thus, the crop-printing process corresponding to the printing sheet of which size is selected by the user can be performed.

When the delivery label printing process is selected as the user operates the radio button 112b on the driver-compliant second setting screen 110, only the sheet sizes equal to four inches width or greater from among the sheet sizes usable by the printer 50 on the pulldown menu which is displayed as the user operates the size setting button 114. Accordingly, it is prevented that the user selects the printing sheets having a size on which the delivery label image 80 cannot be printed, thereby operability being improved.

When the item label printing process is selected as the user operates the radio button 112c on the driver-compliant second setting screen 110, not only the sheet sizes equal to four inches width or greater from among the sheet sizes but the sheet sizes less than four inches are indicated on the pulldown menu. Therefore, when the item label image 70 is relatively small, the user can select a small-sized printing sheet.

When the item label printing process is executed, the sub module 36 identifies the item label image position information and extracts the item label image 70 from the reception data. On the other hand, when the delivery label printing process is executed, the sub module 36 identifies the delivery label image position information, and the main module extracts the delivery label image 80 from the reception data. Accordingly, from the reception data, the item label image 70 or the delivery label image 80 can be extracted appropriately.

It is noted that aspects of the present disclosures should not be limited to the above-described configuration of the illustrative embodiment, but can be modified/improved based on the knowledge of a person skilled in the art. For example, in the above-described embodiment, when the reception data is subjected to the delivery label printing process, the sub module 36 identifies the delivery label image position information, and the main module 34 extracts the delivery label image 80 from the reception data. However, the above configuration may be modified such that both identifying the delivery label image position information and extraction of the delivery label image 80 from the reception data are performed by the sub module 36.

In the illustrative embodiment, as label images subjected to the crop-printing, the item label image 70 used for identifying the items and the delivery label image 80 used for delivering the items are employed. It is of course possible to employ, optionally or alternatively, various other images used for other purposes. Further, in the illustrative embodiment, the item label image 70 and the delivery label image 80 both having code information (e.g., the barcode) are employed as the label image subjected to the crop-printing process. However, it is also possible to employ label images which do not contain the code information.

In the above-described embodiment, in accordance with usages of the image to be printed on the printing sheet, the procedures of generating the printing image data are different. This configuration may be modified such that the procedures of generating the printing image data may be differentiated in accordance with the size of the printing sheets to be used for the printing process. For example, the printing image data may be generated in accordance with a first procedure when the label sheet of which width is four inches or more is used as the printing sheet, while the printing image may be generated in accordance with a second procedure when the label sheet of which width is less than four inches is used as the printing sheet.

In the above-described embodiment, the printing image data is generated such that the delivery label image 80 is printed on the label sheet in a reduced manner according to the first procedure, while the item label image 70 is printed on the label sheet without being reduced according to the second procedure. However, the first procedure and the second procedure need not be limited to be configured as described above. That is, the printing image data may be generated in accordance with various procedures (e.g., with changing the size and/or font of the letters/characters).

In the illustrative embodiment, the printer driver 28 requests for the A4-Letter size image data. However, assuming that only the A4 size images are used, the printer driver 28 may be configured to request for only the A4 size image data. Alternatively, assuming that only the Letter size images are used, the printer driver 28 may be configured to request for only the Letter size image data. In the above case, the A4 size or the Letter size is an example of the first size.

In the illustrative embodiment, when the printer driver 28 receives the vector format image data from the control program 26, the printer driver 28 requests the OS 32 to convert the vector format image data to the bitmap format image data. The configuration may be modified such that the conversion of the vector format image data to the bitmap format image data is performed by the printer driver 28 itself. Further, the printer driver 28 may use the bitmap format image data, which is converted by the printer driver 28 itself, in the process in S206 onwards in FIG. 13. Alternatively, the control application 26 may be configured to output the bitmap format image data instead of the vector format image data. In this case, the printer driver 28 may receive the bitmap format image data output by the control application 26 and use the same in S206 onwards of FIG. 13.

Figure 12:
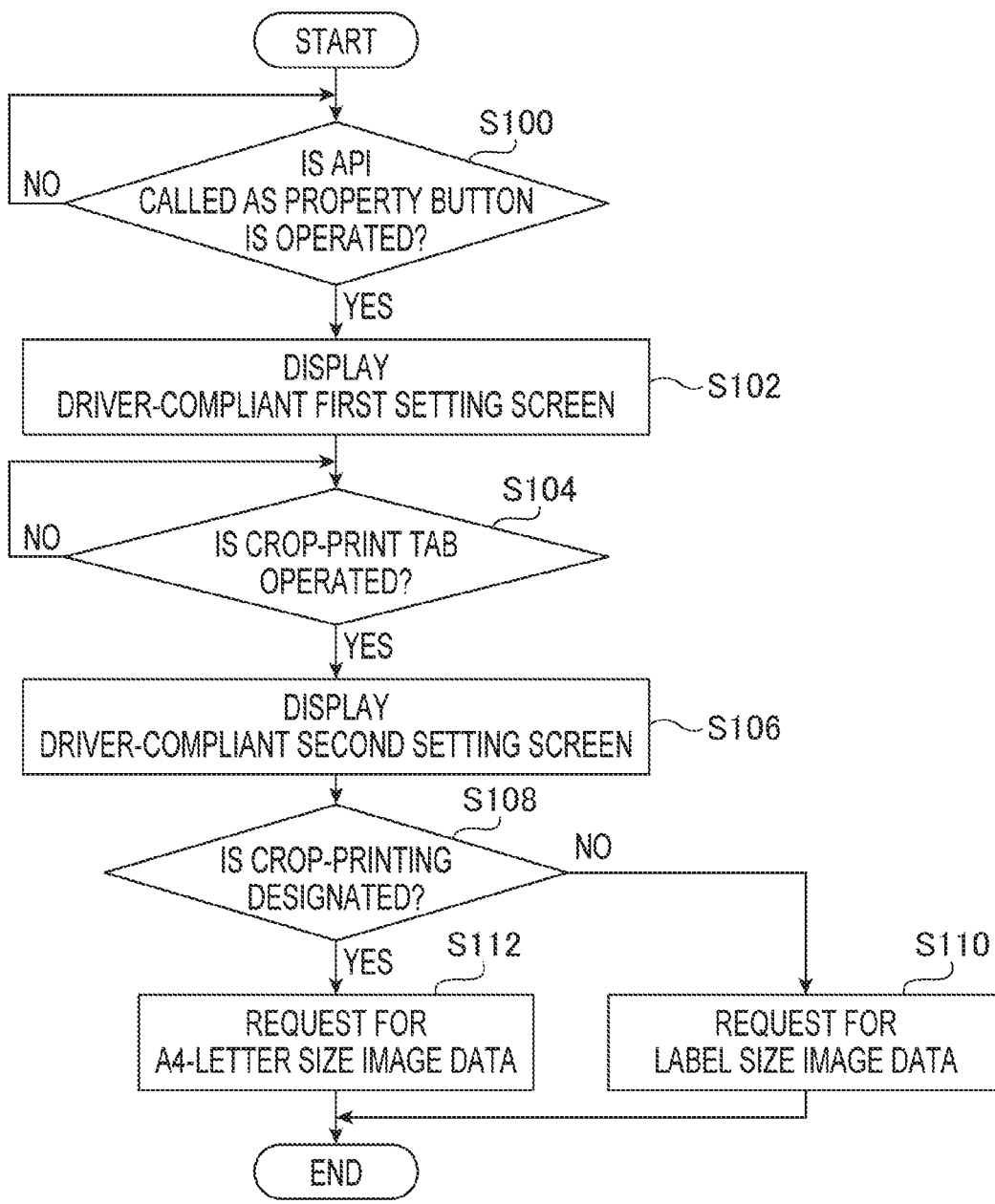
FIG. 12 is a flowchart illustrating a process performed by a printer driver.
Figure 13:
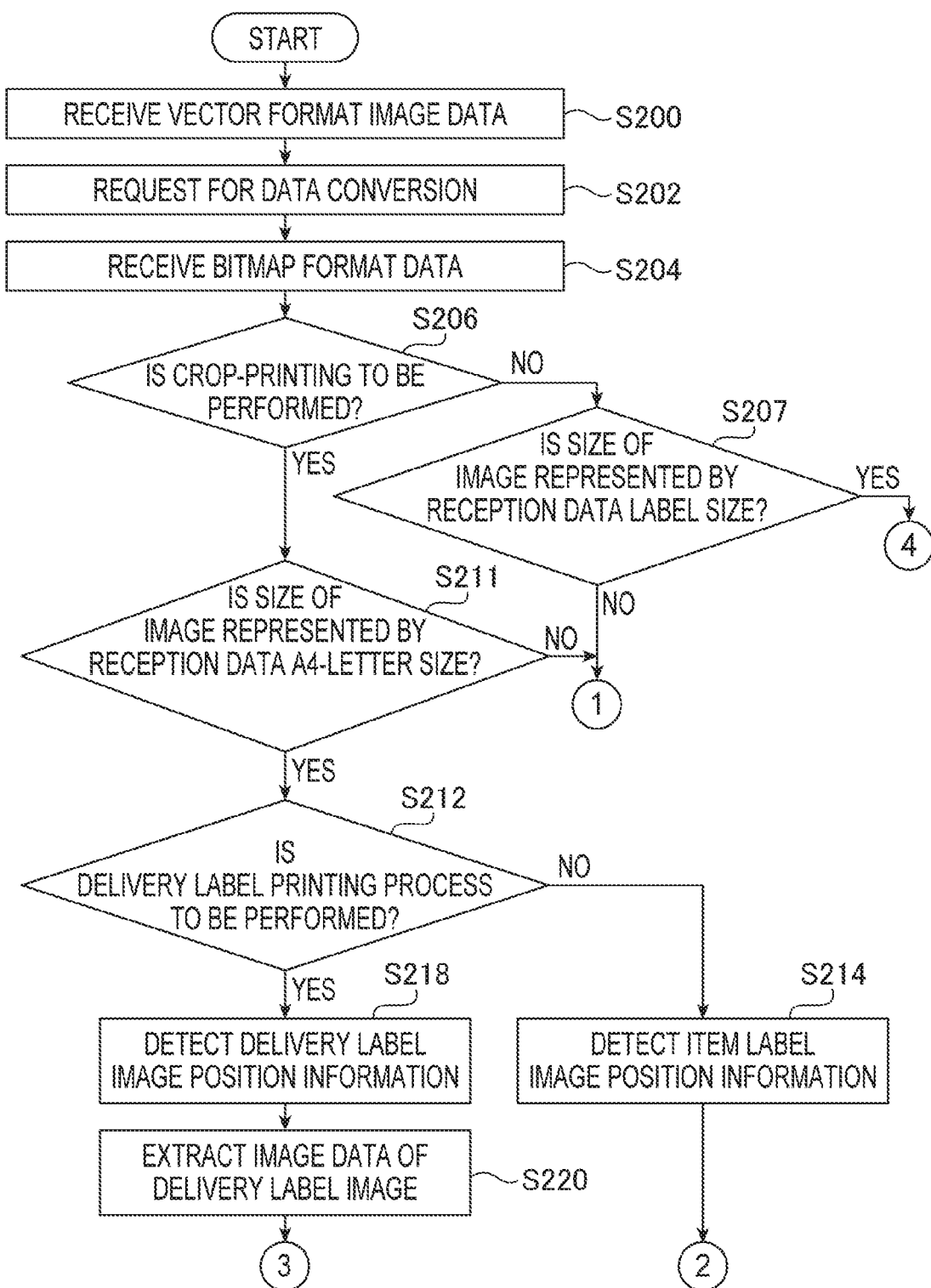
FIGS. 13-14 show a flowchart illustrating a process performed by the printer driver.
Figure 14:
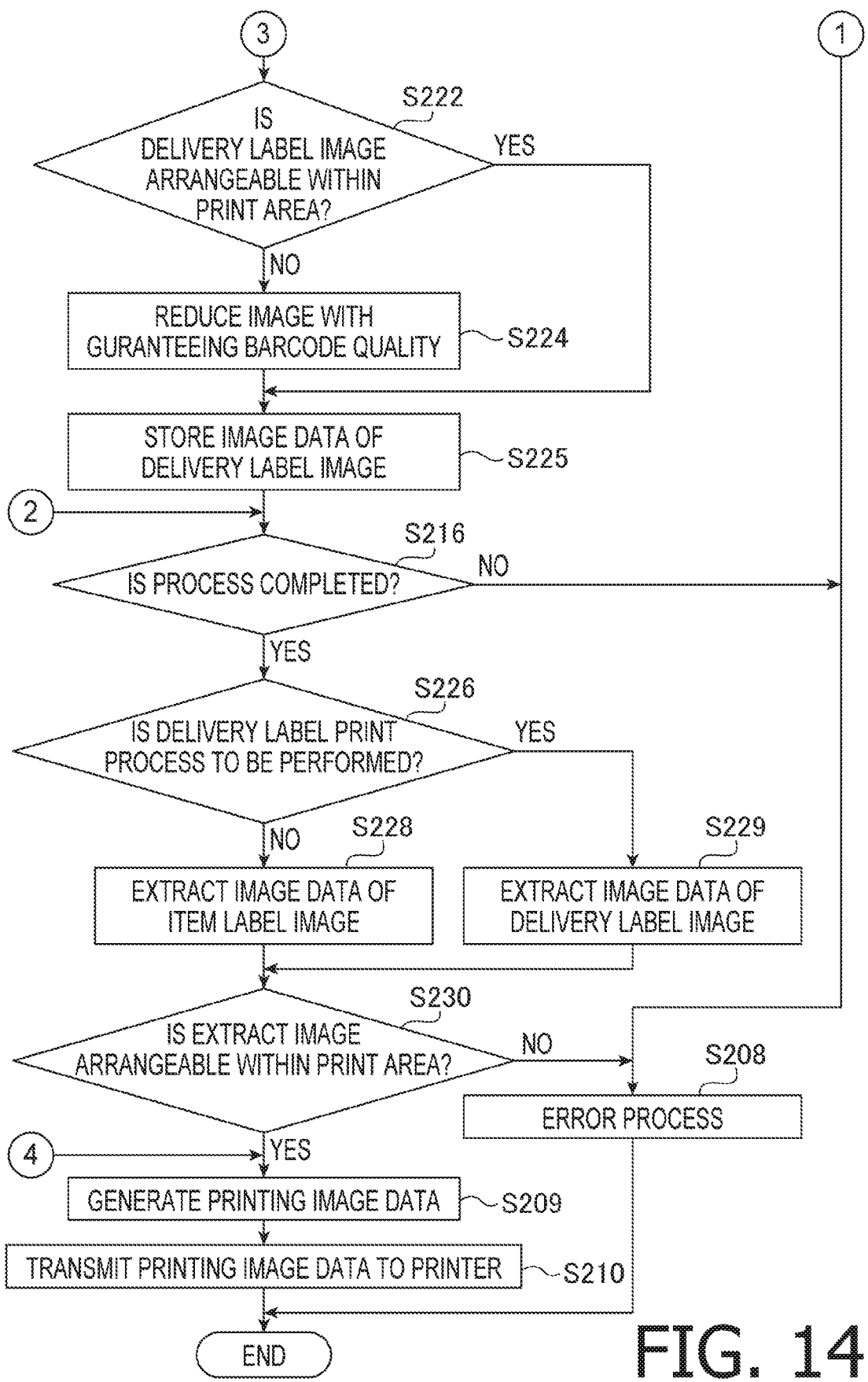

In the illustrative embodiment, the CPU 12 executes the processes shown in FIGS. 12-14. It is noted that the processes may be performed by an ASIC or other logical integrated circuits, or by a combination of the CPU 12, the ASIC and the other logical integrated circuits.

What is claimed is:

1. A non-transitory computer-readable recording medium for an information processing apparatus provided with a communication interface, an input interface, a controller, the controller being configured to read an application which is capable of outputting image data, the recording medium containing print data generating instructions which cause, when executed by the controller, the information processing apparatus to perform:
   a first identifying process of identifying usage of an extract-printing image based on identifying data identifying usage of the extract-printing image, the controller receiving, in the first identifying process, the identifying data through the input interface, the extract-printing image being an image printed in an extract-printing process of extracting a part of an image and printing the extracted image;

a receiving process of receiving the image data output by the application;

an extracting process, in which, in a case where the image data received in the receiving process represents an image of which image size is a first size:

when the usage identified in the first identifying process is a first usage, the controller extracts, in the extracting process, object image data representing a first object included in the image data received in the receiving process; and when the usage identified in the first identifying process is a second usage different from the first usage, the controller extracts object image data representing a second object included in the image data received in the receiving process;

a generating process, in which:

when the object image data representing the first object is extracted in the extracting process, the controller generates image data causing a printer connected to the information processing apparatus through the communication interface to print an image composed such that the first object is arranged on a sheet having a second size different from the first size in accordance with the first procedure, and when the object image data representing the second object is extracted in the extracting process, the controller generates image data causing the printer to print an image composed such that the second object is arranged on the sheet having the second size in accordance with a second procedure different from a first procedure; and an outputting process of outputting print data which is generated in the generating process and to be transmitted to the printer through the communication interface.

2. The non-transitory computer-readable recording medium according to claim 1, wherein the first size is a size of the sheet on which the printer is not configured to perform printing, wherein the second size is a size of the sheet on which the printer is configured to perform printing, wherein the print data generating instructions cause, when executed by the controller, the information processing apparatus to:

perform a first outputting process of outputting first size information indicating that image data representing the image having the first size is receivable; and receive, in the receiving process, the first image data representing the image having the first size and output by the application in accordance with output of the first size information in the first outputting process from the application.

3. The non-transitory computer-readable recording medium according to claim 1, wherein, the print data generating instructions cause, when executed by the controller, the information processing apparatus to output one of first size information and second size information to the application, such that:

when the first size is selected, in the outputting process, from among the first size and the second size, outputting the first size information to the application; and when the second size is selected, in the outputting process, from among the first size and the second size, outputting the second size information to the application, the second size indicating that image data representing an image having the second size is receivable, wherein the data generating instructions cause, when executed by the controller, the information processing apparatus to receive one of image data and second image data, such that:

when the first size information is output in the first outputting process, the information processing apparatus receives the image data output by the application and representing the first size image; and when the second size information is output in the first outputting process, the information processing apparatus receives the second image data representing the second size image which is output by the application in response to output of the second size information in the first outputting process, and wherein the print data generating instructions cause, when executed by the controller, the information processing apparatus to generate the print data such that:

when the first image data is received in the receiving process and the object image data is extracted in the extracting process, the information processing apparatus generates the image data causing the printer to print an image composed such that one of the first object and the second object, which is indicated by the object image data is arranged on the second size sheet, and when the second image data is received in the receiving process, the information processing apparatus generates the print data causing the printer to print an image represented by the second image data on the second size sheet.

4. The non-transitory computer-readable recording medium according to claim 1, wherein, in the generating process, the print data generating instructions further cause the information processing apparatus to:

when object image data representing the first object is extracted in the extracting process and a size of the first object represented by the extracted object image data is a size which cannot be printed within the printing sheet having the second size, a process of reducing the size of the first object is included in the first procedure, and the print data causing the printer to print an image composed such that the first object of which size is reduced is arranged on the printing sheet having the second size is generated; and when object image data representing the second object is extracted in the extracting process, a process of reducing a size of the second object is not included in the second procedure, and the print data causing the printer to print an image composed such that the second object of which size is not reduced is arranged on the printing sheet having the second size is generated.

5. The non-transitory computer-readable recording medium according to claim 4, wherein the first object is an object containing a code image representing code information which is readable by an image scanner, and wherein the print data generating instructions cause, when executed by the controller, the information processing apparatus to generate the print data such that:

when the object image data representing the first object is extracted in the extracting process and the size of the first object represented by the extracted object image data is the size smaller than a printing area of the printing sheet of the second size, a reducing process of reducing the first object with maintaining quality enabling the image scanner to read the code information is included in the first procedure, the print data causing the printer to print an image composed such that the first object of which size is reduced in the reducing process is arranged on the printing sheet having the second size being generated; and when the object image data representing the second object is extracted in the extracting process, a process of reducing the second object is not included in the second procedure and the print data causing the printer to print the image composed such that the second object is arranged, without being reduced, on the printing sheet having the second size is generated.

6. The non-transitory computer-readable recording medium according to claim 1,
wherein the input interface is configured to receive a user operation,
wherein the print data generating instructions cause, when executed by the controller, the information processing apparatus to perform a first display controlling process of displaying a first extract-printing process allowing a user operation to extract an image to be used for the first usage and a second extract-printing process to extract an image to be used for the second usage in a manner selectable from among a plurality of printing processes displayed on a process selection screen on a display interface of the information processing apparatus, and
wherein, in the first identifying process:
when the user interface receives a user operation of selecting the first extract-printing process on the process selection screen as the identifying data, the first usage is identified as a usage of the extract-printing image; and
when the user interface receives a user operation of selecting the second extract-printing process on the process selection screen as the identifying data, the second usage is identified as the usage of the extract-printing image.

7. The non-transitory computer-readable recording medium according to claim 6,
wherein, when the user interface receives the user operation, on the process selection screen, to select the extract-printing process as the identification data, the information processing apparatus performs a second display controlling process to display a size selection screen on which a size of the sheet used for printing is selectable from among a plurality of sizes, and
wherein, in the generating process:
the size of the printing sheet selected on the size selection screen is regarded as the second size;
when image data representing the first object is extracted in the extracting process, the print data causes the printer to print an image composed such that the first object is arranged on the printing sheet, of which size is selected on the size selecting screen, in accordance with the first procedure; and
when image data representing the second object is extracted in the extracting process, the print data causes the printer to print an image composed such that the second object is arranged on the printing sheet, of which size is selected on the size selecting screen, in accordance with the second procedure,
wherein, in the second display controlling process:
when the user interface receives a user operation to select the first extract-printing process on the process selection screen, a size selection screen allowing a user to select a size of the printing sheet to be used for printing from among a plurality of sheet sizes corresponding to ones having a particular setting width or greater; and
when the user interface receives a user operation to select the second extract-printing process on the process selection screen, a size selection screen allowing a user to select the size of the printing sheet to be used for printing from among a plurality of sheet sizes corresponding not only to ones having a particular setting width or greater but ones having a width smaller than the particular setting width.

8. The non-transitory computer-readable recording medium according to claim 1,
wherein the print data generating instructions realize a main module and a sub module,
wherein, when the image data received in the receiving process represents an image of which size is the first size:
when the usage identified in the first identifying process is the first usage:
position information regarding a position of the first object in an image represented by the image data received in the receiving process is identified by the sub module; and
based on the position information as identified, object image data representing the first object is extracted by the sub module; and
when the usage identified in the first identifying process is the second usage:
position information regarding a position of the second object in an image represented by the image data received in the receiving process is identified by the sub module; and
based on the position information as identified, object image data representing the second object is extracted by the sub module.

9. A non-transitory computer-readable recording medium for an information processing apparatus provided with a communication interface, an input interface, a controller, the controller being configured to read an application which is capable of outputting image data, the recording medium containing print data generating instructions which cause, when executed by the controller, the information processing apparatus to perform:
a size identifying process of receiving identifying data used to identify a sheet size of a sheet to be used for printing through the input interface and identifying the sheet size used for printing based on the received identifying data,
a receiving process of receiving the image data output by the application;
an extracting process of extracting an object image data such that:
in a case where the image data received in the receiving process represents an image of which image size is a first size:
when the sheet size identified in the size identifying process is a size different from the first size and a size identifiable based on first identifying data, the controller extracts, in the extracting process, object image data representing a first object included in the image data received in the receiving process is extracted; and when the sheet size identified in the size identifying process is a size different from the first size and a size identifiable based on second identifying data different from the first identifying data, the controller extracts, in the extracting process, object image data representing a second object included in the image data received in the receiving process;

a generating process in which:

when the controller extracts, in the extracting process, image data representing a first object, the controller generates print data used to cause a printer, which is connected to the information processing apparatus through the communication interface, to print an image composed such that the first object is arranged on the sheet having a size identified by the first identifying data in accordance with a first procedure; and when image data representing a second object is extracted in the extracting process, the controller generates the print data used to cause the printer to print an image composed such that the second object is arranged on the sheet having a size identified by the second identifying data in accordance with a second procedure different from the first procedure; and an outputting process of outputting the print data which is generated in the generating process and to be transmitted to the printer through the communication interface.

10. An information processing apparatus provided with a communication interface, an input interface, a storage and a controller, the controller being configured to read an application which is capable of outputting image data, the storage containing print data generating instructions which cause, when executed by the controller, the information processing apparatus to perform:

a first identifying process of identifying usage of an extract-print image based on identifying data identifying usage of the extract-printing image, the controller receiving, in the first identifying process, the identifying data through the input interface, the extract-print image being an image printed in an extract-printing process of extracting a part of an image and printing the extracted image;

a receiving process of receiving the image data output by the application;

an extracting process, in which, when the image data received in the receiving process represents an image of which image size is a first size:

when the usage identified in the first identifying process is a first usage, the controller extracts object image data representing a first object included in the image data received in the receiving process; and when the usage identified in the first identifying process is a second usage different of the first usage, the controller extracts object image data representing a second object included in the image data received in the receiving process;

a generating process, in which:

when the object image data representing the first object is extracted in the extracting process, the controller generates image data causing a printer connected to the information processing apparatus through the communication interface to print an image composed such that the first object is arranged on a sheet having a second size different from the first size in accordance with a first procedure, and when the object image data indicating the second object is extracted in the extracting process, the controller generates image data causing the printer to print an image composed such that the second object is arranged on the sheet having the second size in accordance with the first procedure; and an outputting process of outputting print data which is generated in the generating process and to be transmitted to the printer through the communication interface.

11. A method of controlling an information processing apparatus provided with a communication interface, an input interface, a storage and a controller, the controller being configured to read an application which is capable of outputting image data, the storage containing print data generating instructions which cause, when executed by the controller, the information processing apparatus to perform the method by performing:

identifying usage of an extract-printing image based on identifying data identifying usage of the extract printing image, the identifying data being received through the input interface, the extract-printing image being an image printed by extracting a part of an image and printing the extracted image;

receiving the image data output by the application;

in case where the image data as received represents an image of which image size is a first size:

when the usage as identified is a first usage, extracting object image data representing a first object included in the image data as received; and when the usage as identified is a second usage different from the first usage, extracting object image data representing a second object included in the image data as received;

generating image data such that:

when the object image data representing the first object is extracted, generating image data causing a printer connected to the information processing apparatus through the communication interface to print an image composed such that the first object is arranged on a sheet having a second size different from the first size in accordance with a first procedure, and when the object image data representing the second object is extracted, generating image data causing the printer to print an image composed such that the second object is arranged on the sheet having the second size in accordance with the first procedure; and outputting the image data as generated and to be transmitted to the printer through the communication interface.

* * * * *